(12) United States Patent
Nito

(10) Patent No.: US 11,323,054 B2
(45) Date of Patent: May 3, 2022

(54) MOTOR CONTROL DEVICE AND IMAGE FORMING APPARATUS

(71) Applicant: CANON KABUSHIKI KAISHA, Tokyo (JP)

(72) Inventor: Yuta Nito, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 16/751,971

(22) Filed: Jan. 24, 2020

(65) Prior Publication Data
US 2020/0252016 A1     Aug. 6, 2020

(30) Foreign Application Priority Data

Jan. 31, 2019 (JP) .............................. JP2019-016445

(51) Int. Cl.
| | |
|---|---|
| *H02P 21/00* | (2016.01) |
| *H02P 21/22* | (2016.01) |
| *H02P 27/08* | (2006.01) |
| *H02P 21/18* | (2016.01) |
| *G03G 15/00* | (2006.01) |
| *H02P 6/182* | (2016.01) |
| *H02P 6/28* | (2016.01) |
| *H02P 21/20* | (2016.01) |

(52) U.S. Cl.
CPC ......... *H02P 21/22* (2016.02); *G03G 15/6555* (2013.01); *H02P 6/182* (2013.01); *H02P 6/28* (2016.02); *H02P 21/18* (2016.02); *H02P 21/20* (2016.02); *H02P 27/085* (2013.01)

(58) Field of Classification Search
CPC ............. H02P 21/22; H02P 6/28; H02P 21/18
See application file for complete search history.

(56) References Cited

U.S. PATENT DOCUMENTS

| | | | |
|---|---|---|---|
| 2002/0189301 A1* | 12/2002 | Hosoito | ................. H02P 21/06 68/12.02 |
| 2010/0033064 A1* | 2/2010 | Tanaka | ..................... G01P 3/48 310/67 R |
| 2011/0285332 A1 | 11/2011 | Pollock | |
| 2014/0333241 A1* | 11/2014 | Zhao | ........................ H02P 6/08 318/400.02 |
| 2016/0087567 A1* | 3/2016 | Thomas | ................. H02P 21/06 318/767 |
| 2019/0135003 A1* | 5/2019 | Pfeffer | ..................... B41J 2/325 |

\* cited by examiner

*Primary Examiner* — Erick D Glass
(74) *Attorney, Agent, or Firm* — Canon U.S.A., Inc. IP Division

(57) ABSTRACT

A motor control device includes a driving circuit, a generator configured to generate a pulse-width modulation (PWM) signal, a resistor, an amplifier, a detector configured to detect a driving current flowing through a winding based on the signals output from the amplifier, a phase determiner configured to determine a rotational phase using the driving current detected by the detector and a control value set in advance, a controller configured to control the driving current based on a torque current component so that a deviation between the rotational phase and an instruction phase becomes small, and a setting unit configured to set the control value based on both a local maximum value and a local minimum value of the driving current flowing through the winding by a voltage applied to the winding based on the PWM signal of which a duty cycle is set to a predetermined value.

7 Claims, 13 Drawing Sheets

MOTOR CONTROL DEVICE AND IMAGE FORMING APPARATUS

BACKGROUND OF THE INVENTION

Field of the Invention

The present disclosure relates to control of a motor in a motor control device and an image forming apparatus.

Description of the Related Art

Conventionally, as a method for controlling a motor, there is known a method referred to as a vector control for controlling a motor by controlling current values in a rotating coordinate system based on a rotational phase of a rotor of the motor. More specifically, there is known a method for controlling a motor by performing a phase feedback control for controlling the current values in the rotating coordinate system so as to reduce a deviation between an instruction phase and the rotational phase of the rotor. There is also known a method for controlling a motor by performing a velocity feedback control for controlling the current values in the rotating coordinate system so as to reduce the deviation between an instruction velocity and a rotational velocity of the rotor.

In the vector control, a driving current flowing through a winding of the motor is represented by a q-axis component (torque current component), which is a current component that generates torque for rotating the rotor, and a d-axis component (excitation current component), which is a current component that affects strength of magnetic flux through the winding of the motor. A value of the torque current component is controlled according to a change in load torque applied to the rotor, thereby efficiently generating the torque required for the rotation of the rotor. This results in preventing an increase in a motor sound and an increase in power consumption due to excess torque.

In the vector control, a configuration for determining the rotational phase of the rotor is required. United States Patent Application Publication No. 2011/0285332 discusses a configuration for, using values of resistance R and inductance L of a winding (hereinafter referred to as control values), determining an inductive voltage to be generated in the winding due to the rotation of a rotor and determining the rotational phase of the rotor based on the inductive voltage.

The control values used to determine the inductive voltage in the method of United States Patent Application Publication No. 2011/0285332 are values specific to a motor and are set in advance based on the values of the resistance R and the inductance L of the winding of the motor that to be attached to a motor control device.

For example, if the vector control is executed by attaching a motor B of a type different from a motor A to a motor control device in which the control values are set to values corresponding to the motor A, the rotational phase of a rotor of the motor B cannot be determined with high accuracy. As a result, control of the motor B becomes unstable, and the motor B may step out.

SUMMARY OF THE INVENTION

The present invention is directed to preventing control of a motor from becoming unstable.

According to an aspect of the present invention, a motor control device includes a driving circuit that includes a plurality of switching elements and to which a winding of a motor attached to the motor control device is connected, a generator configured to generate a pulse-width modulation (PWM) signal that controls an on operation and an off operation of each of the plurality of switching elements, the PWM signal including a signal at a first level as one of a high level and a low level, and a signal at a second level as the other of the high level and the low level, a resistor configured to detect a driving current flowing through the winding of the motor attached to the motor control device, an amplifier configured to amplify a signal indicating a voltage between both ends of the resistor, a detector configured to detect the driving current flowing through the winding based on the signals output from the amplifier, a phase determiner configured to determine a rotational phase of a rotor of the motor attached to the motor control device using the driving current detected by the detector and a control value set in advance, a controller configured to control the driving current based on a torque current component so that a deviation between the rotational phase determined by the phase determiner and an instruction phase representing a target phase of the rotor of the motor attached to the motor control device becomes small, the torque current component being a current component that is represented in a rotating coordinate system based on the rotational phase determined by the phase determiner and that generates torque in the rotor, and a setting unit configured to set the control value based on both a local maximum value and a local minimum value of the driving current flowing through the winding by a voltage applied to the winding based on the PWM signal of which a duty cycle is set to a predetermined value, the duty cycle being a value indicating a ratio of a period in which the PWM signal is at the first level to one period of the PWM signal.

Further features of the present invention will become apparent from the following description of exemplary embodiments with reference to the attached drawings.

DESCRIPTION OF THE EMBODIMENTS

Exemplary embodiments of the present invention will be described below with reference to the drawings. However, shapes and relative arrangements of components described in the exemplary embodiments can be appropriately changed depending on a configuration of an apparatus to which the present invention is applied and various conditions, and the scope of the present invention is not limited to the exemplary embodiments described below. In the description, a case is described where a motor control device is provided in an image forming apparatus. However, the motor control device is provided not only in the image forming apparatus. For example, the motor control device is also used in a sheet conveying apparatus that conveys a recording medium or a sheet such as a document.

<Image Forming Apparatus>

Figure 1:
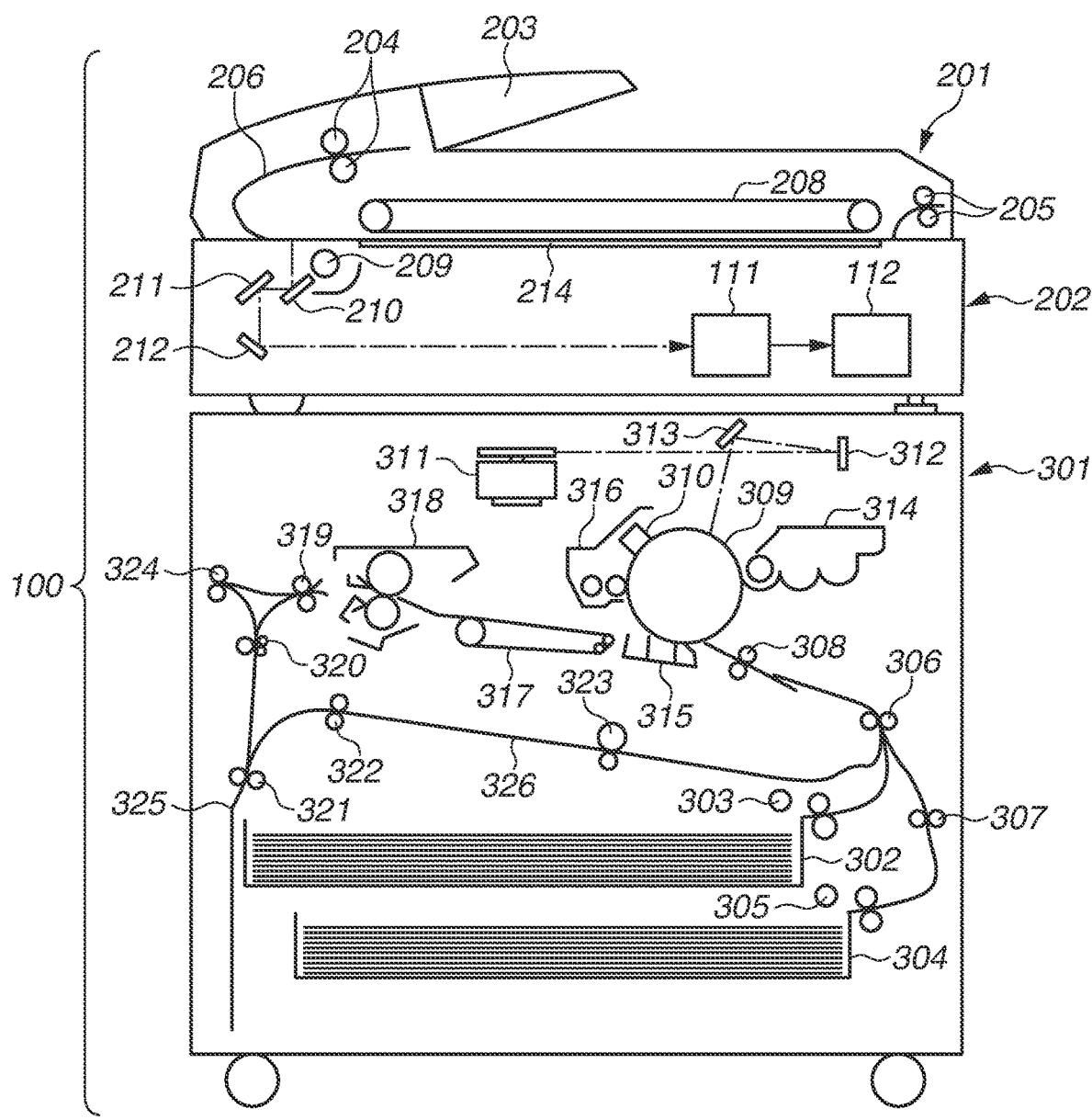
FIG. 1 is a cross-sectional view illustrating an image forming apparatus according to a first exemplary embodiment.

FIG. 1 is a cross-sectional view illustrating a configuration of a monochrome electrophotographic copying machine (hereinafter referred to as an image forming apparatus) 100 that includes a sheet conveying apparatus used in a first exemplary embodiment. The image forming apparatus 100 is not limited to a copying machine, and may be, for example, a facsimile apparatus, a printing machine, or a printer. A recording method is not limited to an electrophotographic method, and may be, for example, an inkjet method. Further, a format of the image forming apparatus 100 may be either a monochrome format or a color format.

With reference to FIG. 1, the configuration and a function of the image forming apparatus 100 are described below. As illustrated in FIG. 1, the image forming apparatus 100 includes a document feeding apparatus 201, a reading apparatus 202, and an image printing apparatus 301.

A document stacked in a document stacking unit 203 of the document feeding apparatus 201 is fed by feed rollers 204 and conveyed along a conveyance guide 206 onto a document glass platen 214 of the reading apparatus 202. Further, the document is conveyed by a conveying belt 208 and discharged to a sheet discharge tray (not illustrated) by sheet discharge rollers 205. Reflected light from an image on the document illuminated by an illumination system 209 at a reading position of the reading apparatus 202 is guided to an image reading unit 111 by an optical system including reflecting mirrors 210, 211, and 212 and is converted into an image signal by the image reading unit 111. The image reading unit 111 includes a lens, a charge-coupled device (CCD), which is a photoelectric conversion element, and a driving circuit for the CCD. The image signal output from the image reading unit 111 is subjected to various correction processes by an image processing unit 112 that includes a hardware device such as an application-specific integrated circuit (ASIC). Then, the resulting image signal is output to the image printing apparatus 301. As described above, a document is read. In other words, the document feeding apparatus 201 and the reading apparatus 202 function as a document reading apparatus.

Document reading modes include a first reading mode and a second reading mode. The first reading mode is a mode where the illumination system 209 and the optical system, fixed at predetermined positions, read an image on a document conveyed at a constant velocity. The second reading mode is a mode where the illumination system 209 and the optical system, moving at a constant velocity, read an image on a document placed on the document glass platen 214 of the reading apparatus 202. Normally, an image on a sheet-like document is read in the first reading mode, and an image on a bound document such as a book or a booklet is read in the second reading mode.

Sheet holding trays 302 and 304 are provided inside the image printing apparatus 301. Each of the sheet holding trays 302 and 304 can hold a different type of recording media. For example, A4-size plain paper is held in the sheet holding tray 302, and A4-size thick paper is held in the sheet holding tray 304. On each of the recording media, an image is to be formed by the image forming apparatus 100. The recording media include, for example, a sheet, a resin sheet, cloth, an overhead projector (OHP) sheet, and a label.

The recording medium held in the sheet holding tray 302 is fed by a pickup roller 303 and sent out to registration rollers 308 by conveying rollers 306. The recording medium held in the sheet holding tray 304 is fed by a pickup roller 305 and sent out to the registration rollers 308 by conveying rollers 307 and 306.

The image signal output from the reading apparatus 202 is input to an optical scanning device 311 that includes a semiconductor laser and a polygon mirror. An outer peripheral surface of a photosensitive drum 309 is charged by a charging device 310. After the outer peripheral surface of the photosensitive drum 309 is charged, laser light corresponding to the image signal input from the reading apparatus 202 to the optical scanning device 311 is emitted from the optical scanning device 311 to the outer peripheral surface of the photosensitive drum 309 via the polygon mirror and mirrors 312 and 313. As a result, an electrostatic latent image is formed on the outer peripheral surface of the photosensitive drum 309.

Next, the electrostatic latent image is developed with toner in a developing device 314, thereby forming a toner image on the outer peripheral surface of the photosensitive drum 309. The toner image formed on the photosensitive drum 309 is transferred onto the recording medium by a transfer charging device 315 provided at a position (transfer position) opposed to the photosensitive drum 309. The registration rollers 308 send the recording medium to the transfer position with this transfer timing.

As described above, the recording medium onto which the toner image has been transferred is sent to a fixing device 318 by a conveying belt 317 and is heated and pressurized by the fixing device 318, thereby fixing the toner image to the recording medium. In this manner, the image is formed on the recording medium by the image forming apparatus 100.

In a case where an image is formed in a one-sided printing mode, the recording medium having passed through the fixing device 318 is discharged to a sheet discharge tray (not illustrated) by sheet discharge rollers 319 and 324. In a case where an image is formed in a two-sided printing mode, a fixing process is performed on a first surface of the recording medium by the fixing device 318, and then, the recording medium is conveyed to a reversing path 325 by the sheet discharge rollers 319, conveying rollers 320, and reversing rollers 321. Then, the recording medium is conveyed to the registration rollers 308 again by conveying rollers 322 and 323, and the image is formed on a second surface of the recording medium by the above-described method. Then, the recording medium is discharged to the sheet discharge tray (not illustrated) by the sheet discharge rollers 319 and 324.

In a case where the recording medium, on the first surface of which the image is formed, is discharged face-down to outside the image forming apparatus 100, the recording medium having passed through the fixing device 318 is conveyed through the sheet discharge rollers 319 in a direction toward the conveying rollers 320. Then, immediately before passing of the rear end of the recording medium through a nip portion of the conveying rollers 320, rotation of the conveying rollers 320 is reversed, thereby discharging the recording medium to outside the image forming apparatus 100 via the sheet discharge rollers 324 in the state where the first surface of the recording medium faces down.

The configuration and the function of the image forming apparatus 100 have been described as above. In the present exemplary embodiment, a load refers to a target object to be driven by the motor. For example, various rollers (conveying rollers) such as the feed rollers 204, the pickup rollers 303 and 305, the registration rollers 308, and the sheet discharge rollers 319, the photosensitive drum 309, and the developing device 314 correspond to the loads according to the present exemplary embodiment. The motor control device according to the present exemplary embodiment can be applied to such a motor that drives these loads.

Figure 2:
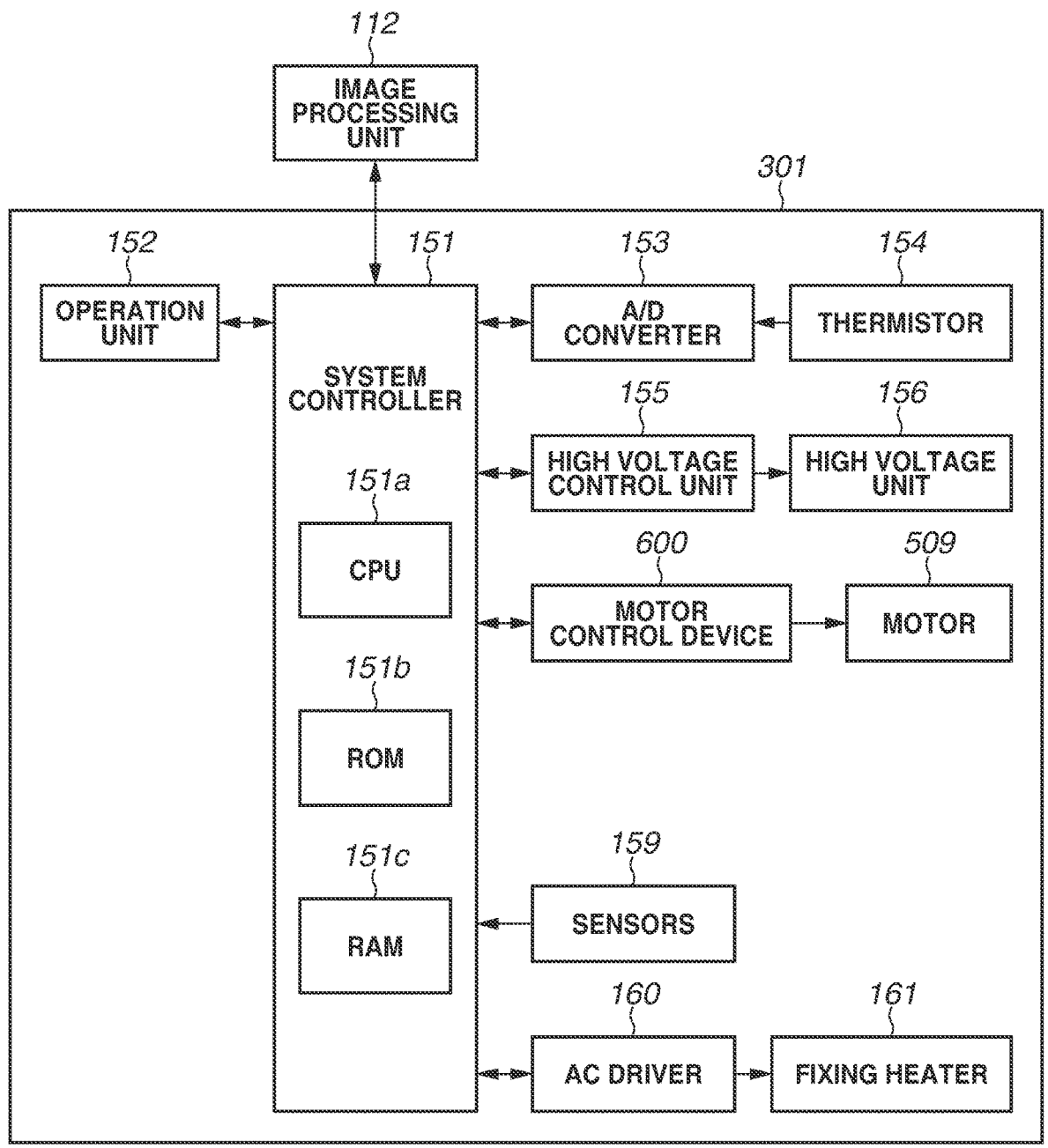
FIG. 2 is a block diagram illustrating a control configuration of the image forming apparatus according to the first exemplary embodiment.

FIG. 2 is a block diagram illustrating an example of the control configuration of the image forming apparatus 100. As illustrated in FIG. 2, a system controller 151 includes a central processing unit (CPU) 151a, a read-only memory (ROM) 151b, and a random-access memory (RAM) 151c. The system controller 151 is connected to the image processing unit 112, an operation unit 152, an analog-to-digital (A/D) converter 153, a high voltage control unit 155, a motor control device 600, sensors 159, and an alternating current (AC) driver 160. The system controller 151 can transmit and receive data and a command to and from the units connected to the system controller 151.

The CPU 151a reads and executes various programs stored in the ROM 151b, thereby executing various sequences related to an image forming sequence determined in advance.

The RAM 151c is a storage device. The RAM 151c stores various types of data such as a setting value for the high voltage control unit 155, an instruction value for the motor control device 600, and information received from the operation unit 152.

The system controller 151 transmits, to the image processing unit 112, setting value data of various devices provided inside the image forming apparatus 100, required for image processing by the image processing unit 112. Further, the system controller 151 receives signals from the sensors 159, and based on the received signals, sets a setting value for the high voltage control unit 155.

Corresponding to the setting value set by the system controller 151, the high voltage control unit 155 supplies a required voltage to a high voltage unit 156 (the charging device 310, the developing device 314, and the transfer charging device 315).

In response to an instruction output from the CPU 151a, the motor control device 600 controls a motor 509. In FIG. 2, only the motor 509 is illustrated as the motor of the image forming apparatus 100. However, two or more motors are actually provided in the image forming apparatus 100. Alternatively, a configuration may be employed in which a single motor control device controls a plurality of motors. Further, while only a single motor control device is provided in FIG. 2, two or more motor control devices may be provided in the image forming apparatus 100.

The A/D converter 153 receives a detected signal detected by a thermistor 154 that detects a temperature of a fixing heater 161. Then, the A/D converter 153 converts the detected signal from an analog signal to a digital signal and transmits the digital signal to the system controller 151. Based on the digital signal received from the A/D converter 153, the system controller 151 controls the AC driver 160. The AC driver 160 controls the fixing heater 161 so that the temperature of the fixing heater 161 becomes a temperature required to perform a fixing process. The fixing heater 161 is a heater used in the fixing process and is included in the fixing device 318.

The system controller 151 controls the operation unit 152 to display, on a display unit provided in the operation unit 152, an operation screen for a user to set a type of the recording medium to be used (hereinafter referred to as the paper type). The system controller 151 receives information set by the user from the operation unit 152, and based on the information set by the user, controls an operation sequence of the image forming apparatus 100. The system controller 151 transmits, to the operation unit 152, information indicating a state of the image forming apparatus 100. The information indicating the state of the image forming apparatus 100 is, for example, information about the number of images to be formed, a progress state of an image forming operation, and a jam or multi-feed of a sheet in the document feeding apparatus 201 and the image printing apparatus 301. The operation unit 152 displays, on the display unit, the information received from the system controller 151.

As described above, the system controller 151 controls the operation sequence of the image forming apparatus 100.

<Motor Control Device>

Next, the motor control device 600 according to the present exemplary embodiment is described. The motor control device 600 according to the present exemplary embodiment controls the motor 509 using a vector control. In the present exemplary embodiment, as the motor 509, a motor A or a motor B, which is of a different type from the motor A, can be attached to the motor control device 600. In the descriptions below, a configuration is described in which, as the motor 509, the motor A is attached to the motor control device 600.

<Vector Control>

Figure 3:
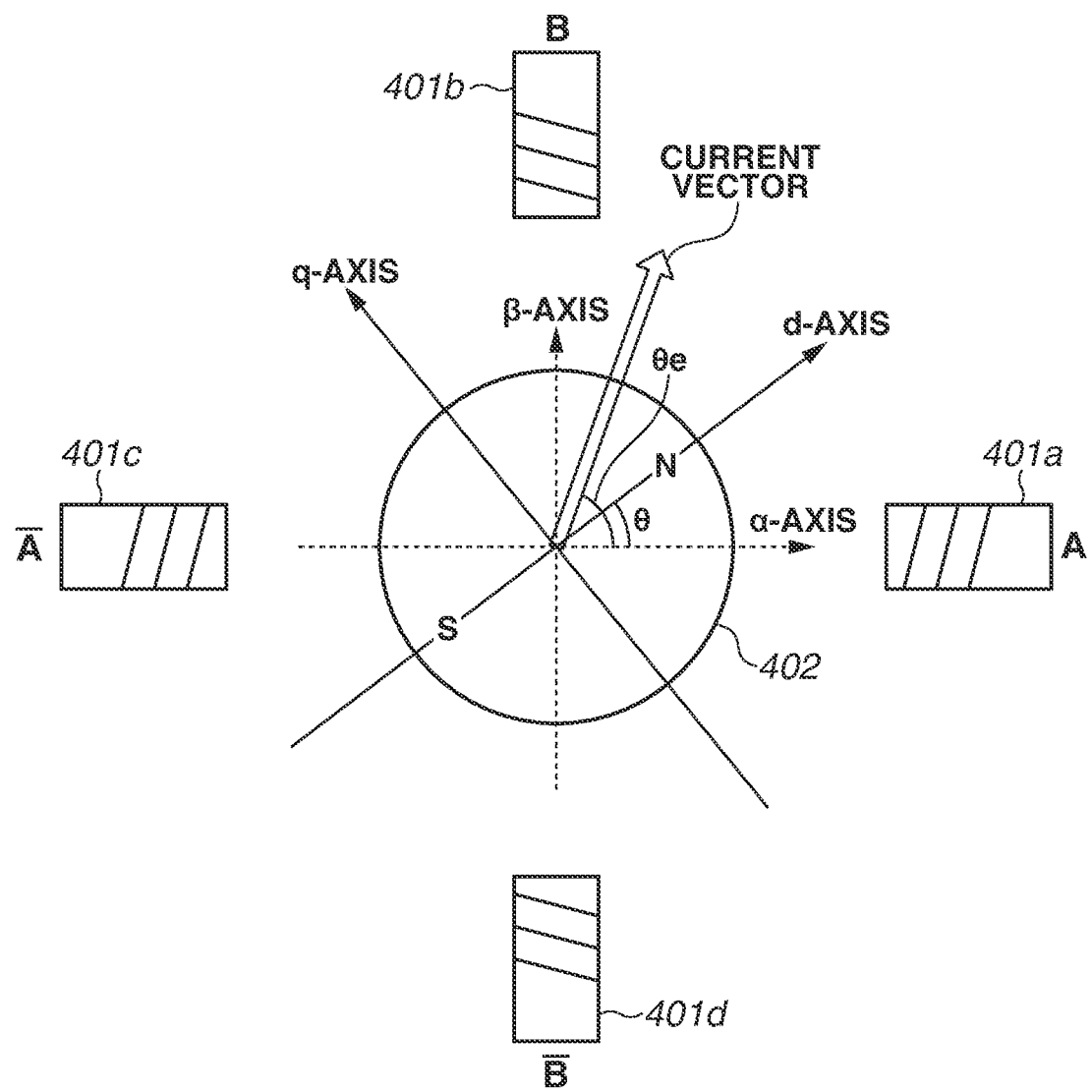
FIG. 3 is a diagram illustrating a relationship between a two-phase motor including an A-phase and a B-phase, and a rotating coordinate system represented by a d-axis and a q-axis.
Figure 4:
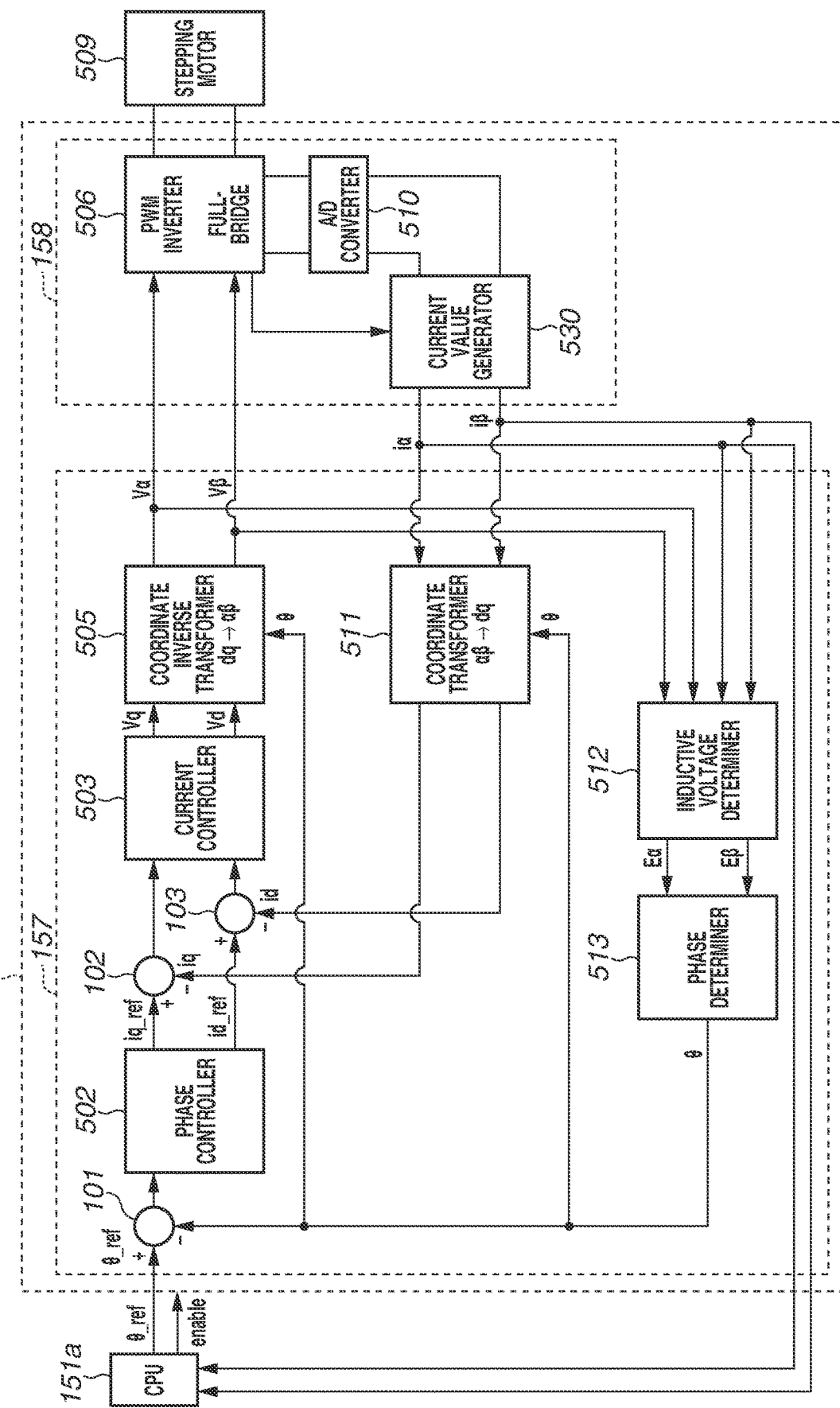
FIG. 4 is a block diagram illustrating a configuration of a motor control device according to the first exemplary embodiment.

First, with reference to FIGS. 3 and 4, a description is given of a method in which the motor control device 600 according to the present exemplary embodiment performs the vector control. In the motor in the descriptions below, a sensor such as a rotary encoder for detecting a rotational phase of a rotor of the motor is not provided.

FIG. 3 is a diagram illustrating a relationship between the stepping motor (hereinafter referred to as the motor) 509 that has two phases including an A-phase (first phase) and a B-phase (second phase), and a rotating coordinate system represented by a d-axis and a q-axis. In FIG. 3, in a stationary coordinate system, an α-axis, which is an axis corresponding to a winding in the A-phase, and a β-axis, which is an axis corresponding to a winding in the B-phase, are defined. In FIG. 3, the d-axis is defined to be along a direction of magnetic flux generated by magnetic poles of a permanent magnet used in a rotor 402, and the q-axis is defined to be along a direction rotated 90 degrees counterclockwise from the d-axis (direction orthogonal to the d-axis). An angle between the α-axis and the d-axis is defined as θ, and the rotational phase of the rotor 402 is represented by the angle θ. In the vector control, a rotating coordinate system based on a rotational phase θ of the rotor 402 is used. More specifically, in the vector control, a q-axis component (torque current component) and a d-axis component (excitation current component), which are current components in the rotating coordinate system of a current vector corresponding to a driving current flowing through each winding, are used. The q-axis component (torque current component) generates torque in the rotor 402, and the d-axis component (excitation current component) affects strength of magnetic flux passing through the winding.

The vector control is a method for controlling a motor by performing a phase feedback control for controlling a value of the torque current component and a value of the excitation current component so as to reduce a deviation between an instruction phase, which indicates a target phase of a rotor, and an actual rotational phase of the rotor. There is also a method for controlling a motor by performing a velocity feedback control for controlling the value of the torque current component and the value of the excitation current component so as to reduce a deviation between an instruction velocity, which indicates a target velocity of a rotor, and an actual rotational velocity of the rotor.

FIG. 4 is a block diagram illustrating an example of a configuration of the motor control device 600 that controls the motor 509. The motor control device 600 according to the present exemplary embodiment includes a motor control unit 157 that controls the motor 509 using the vector control, and a motor driving unit 158 that drives the motor 509 by supplying a driving current to each winding of the motor 509. The motor control device 600 includes at least one ASIC and executes functions described below.

The motor control unit 157 includes, as a circuit for performing the vector control, a phase controller 502, a current controller 503, a coordinate inverse transformer 505, and a coordinate transformer 511. The coordinate transformer 511 performs coordinate transformation on current vectors, which corresponds to driving currents flowing through the windings in the A-phase and the B-phase of the motor 509, from the stationary coordinate system represented by the α-axis and the β-axis to the rotating coordinate system represented by the q-axis and the d-axis. As a result, the driving currents flowing through the windings are represented by the current value of the q-axis component (q-axis current) and the current value of the d-axis component (d-axis current), which are the current values in the rotating coordinate system. The q-axis current corresponds to a torque current that generates torque in the rotor 402 of the motor 509. The d-axis current corresponds to an excitation current that affects the strength of the magnetic flux passing through each winding of the motor 509. The motor control device 600 can independently control the q-axis current and the d-axis current. As a result, the motor control unit 157 can control the q-axis current corresponding to load torque applied to the rotor 402 and thereby can efficiently generate torque required for the rotation of the rotor 402. In other words, in the vector control, magnitude of the current vector illustrated in FIG. 3 changes according to the load torque applied to the rotor 402.

The motor control unit 157 determines the rotational phase θ of the rotor 402 of the motor 509 using a method described below, and based on the determination result, performs the vector control. The CPU 151a generates an instruction phase θ_ref that indicates a target phase of the rotor 402 of the motor 509. Then, the CPU 151a outputs the instruction phase θ_ref to the motor control device 600. In actuality, the CPU 151a outputs a pulse signal to the motor control device 600. The number of pulses corresponds to an instruction phase, and the frequency of pulses corresponds to a target velocity. The instruction phase θ_ref is generated based on, for example, the target velocity of the motor 509.

A subtracter 101 calculates a deviation Δθ between the rotational phase θ of the rotor 402 of the motor 509, which is output from a phase determiner 513, and the instruction phase θ_ref. Then, the subtracter 101 outputs the deviation Δθ.

The phase controller 502 acquires the deviation Δθ in a period T (e.g. 200 μs). Based on proportional control (P), integral control (I), and derivative control (D), the phase controller 502 generates a q-axis current instruction value iq_ref and a d-axis current instruction value id_ref so as to reduce the deviation Δθ acquired from the subtracter 101. Then, the phase controller 502 outputs the q-axis current instruction value iq_ref and the d-axis current instruction value id_ref. More specifically, based on a P-control, an I-control, and a D-control, the phase controller 502 generates the q-axis current instruction value iq_ref and the d-axis current instruction value id_ref so as to make the deviation Δθ acquired from the subtracter 101 0. Then, the phase controller 502 outputs the q-axis current instruction value iq_ref and the d-axis current instruction value id_ref. The P-control is a method for controlling the value of a target to be controlled, based on a value proportional to the deviation between an instruction value and an estimated value. The I-control is a method for controlling the value of the target to be controlled, based on a value proportional to a time integral of the deviation between the instruction value and the estimated value. The D-control is a method for controlling the value of the target to be controlled, based on a value proportional to a temporal change in the deviation between the instruction value and the estimated value. The phase controller 502 according to the present exemplary embodiment generates the q-axis current instruction value iq_ref and the d-axis current instruction value id_ref based on a proportional-integral-derivative (PID) control. The present invention, however, is not limited to this. For example, the phase controller 502 may generate the q-axis current instruction value iq_ref and the d-axis current instruction value id_ref based on proportional-integral (PI) control. In the present exemplary embodiment, the d-axis current instruction value id_ref, which affects the strength of the magnetic flux passing through each winding, is set to 0. However, the present invention is not limited to this.

Driving currents flowing through the windings in the A-phase and the B-phase of the motor 509 are detected by the motor driving unit 158 using a method described below. The current values of the driving currents detected by the motor driving unit 158 are represented as current values iα and iβ in the stationary coordinate system by the following formulas, using a phase θe of the current vector illustrated in FIG. 3. The phase θe of the current vector is defined as an angle between the α-axis and the current vector. I represents the magnitude of the current vector.

$$i\alpha = I^* \cos \theta e \quad (1)$$

$$i\beta = I^* \sin \theta e \quad (2)$$

The current values iα and iβ are input to the coordinate transformer 511 and an inductive voltage determiner 512.

The coordinate transformer 511 transforms the current values iα and iβ in the stationary coordinate system into a current value iq of the q-axis current and a current value id of the d-axis current in the rotating coordinate system by the following formulas.

$$id = \cos \theta^* i\alpha + \sin \theta^* i\beta \quad (3)$$

$$iq = -\sin \theta^* i\alpha + \cos \theta^* i\beta \quad (4)$$

The coordinate transformer 511 outputs the transformed current value iq to a subtracter 102. The coordinate transformer 511 also outputs the transformed current value id to a subtracter 103.

The subtracter 102 calculates the deviation between the q-axis current instruction value iq_ref and the current value iq and outputs the calculated deviation to the current controller 503.

The subtracter 103 calculates the deviation between the d-axis current instruction value id_ref and the current value id and outputs the calculated deviation to the current controller 503.

The current controller 503 generates driving voltages Vq and Vd based on the PID control so as to reduce each of the deviations to be input to the current controller 503. More specifically, the current controller 503 generates the driving voltages Vq and Vd so as to make each of the deviations input to the current controller 503 0. Then, the current controller 503 outputs the driving voltages Vq and Vd to the coordinate inverse transformer 505. The current controller 503 according to the present exemplary embodiment generates the driving voltages Vq and Vd based on the PID control. However, the present invention is not limited to this. For example, the current controller 503 may generate the driving voltages Vq and Vd based on the PI control.

The coordinate inverse transformer 505 inversely transforms the driving voltages Vq and Vd in the rotating coordinate system, which are output from the current controller 503, into driving voltages Vα and Vβ in the stationary coordinate system by the following formulas.

$$V\alpha = \cos\theta \cdot Vd - \sin\theta \cdot Vq \quad (5)$$

$$V\beta = \sin\theta \cdot Vd + \cos\theta \cdot Vq \quad (6)$$

The coordinate inverse transformer 505 outputs the inversely transformed driving voltages Vα and Vβ to the inductive voltage determiner 512 and a pulse-width modulation (PWM) inverter 506.

The PWM inverter 506 includes a full-bridge circuit. The full-bridge circuit is driven by PWM signals based on the driving voltages Vα and Vβ input from the coordinate inverse transformer 505. As a result, the PWM inverter 506 generates driving currents iα and iβ corresponding to the driving voltages Vα and Vβ and supplies the driving currents iα and iβ to the windings in the respective phases of the motor 509 to drive the motor 509. In the present exemplary embodiment, the PWM inverter 506 includes a full-bridge circuit. Alternatively, the PWM inverter 506 may include a half-bridge circuit.

Next, a description is given of a method for determining the rotational phase θ. The rotational phase θ of the rotor 402 is determined using values of inductive voltages Eα and Eβ induced in the windings in the A-phase and the B-phase of the motor 509 by the rotation of the rotor 402. The value of each of the inductive voltages Eα and Eβ is determined (calculated) by the inductive voltage determiner 512. More specifically, the inductive voltages Eα and Eβ are determined by the following formulas, based on the current values iα and iβ input from an A/D converter 510 to the inductive voltage determiner 512 and the driving voltages Vα and Vβ input from the coordinate inverse transformer 505 to the inductive voltage determiner 512.

$$E\alpha = V\alpha - R \cdot i\alpha - L \cdot di\alpha/dt \quad (7)$$

$$E\beta = V\beta - R \cdot i\beta - L \cdot di\beta/dt \quad (8)$$

In the formulas, R represents a winding resistance, and L represents a winding inductance. The values of the winding resistance R and the winding inductance L (hereinafter referred to as the control values) are values specific to the motor A as the motor 509 in use, and are stored in advance in the ROM 151b. Control values regarding the motor B are also stored in advance in the ROM 151b. Based on the type of motor attached to the motor control device 600, the CPU 151a sets either the control values regarding the motor A or the control values regarding the motor B as the control values. The control values according to the present exemplary embodiment also include, for example, a gain value used to determine the current instruction value such as the q-axis current instruction value iq_ref (i.e., for the PID control).

The inductive voltages Eα and Eβ determined by the inductive voltage determiner 512 are output to the phase determiner 513.

Based on a ratio between the inductive voltage Eα and the inductive voltage Eβ output from the inductive voltage determiner 512, the phase determiner 513 determines the rotational phase θ of the rotor 402 of the motor 509 by the following formula.

$$\theta = \tan^{-1}(-E\beta/E\alpha) \quad (9)$$

In the present exemplary embodiment, the phase determiner 513 determines the rotational phase θ by performing calculation based on the formula (9). However, the present invention is not limited to this. For example, the phase determiner 513 may determine the rotational phase θ by referencing a table stored in the ROM 151b and illustrating relationships between the inductive voltages Eα and Eβ and the rotational phase θ corresponding to the inductive voltages Eα and Eβ.

The rotational phase θ of the rotor 402 obtained as described above is input to the subtracter 101, the coordinate inverse transformer 505, and the coordinate transformer 511.

The motor control device 600 repeatedly performs the above-described control.

As described above, the motor control device 600 according to the present exemplary embodiment performs the vector control for controlling the current values in the rotating coordinate system so as to reduce the deviation between the instruction phase θ_ref and the rotational phase θ. By performing the vector control, it is possible to prevent the motor from entering a step-out state, prevent an increase in a motor sound, and prevent an increase in power consumption due to excess torque. Since the rotational phase is fed back, it is possible to perform control so that the rotational phase of the rotor is the predetermined phase. Thus, in the image forming apparatus, the vector control using the phase feedback control is applied to the motor that drives a load (e.g., registration roller) of which the rotational phase needs to be controlled with high accuracy to appropriately form an image on a recording medium. As a result, it is possible to appropriately form the image on the recording medium.

<Motor Driving Unit>

As described above, in control of the driving of the motor, the current value of the driving current flowing through each winding is detected, and based on the detected current value, the driving current flowing through the winding is controlled. In other words, in the control of the driving of the motor, a configuration for detecting the current value of the driving current flowing through each winding and a configuration for supplying the driving current to the winding are required.

Figure 5:
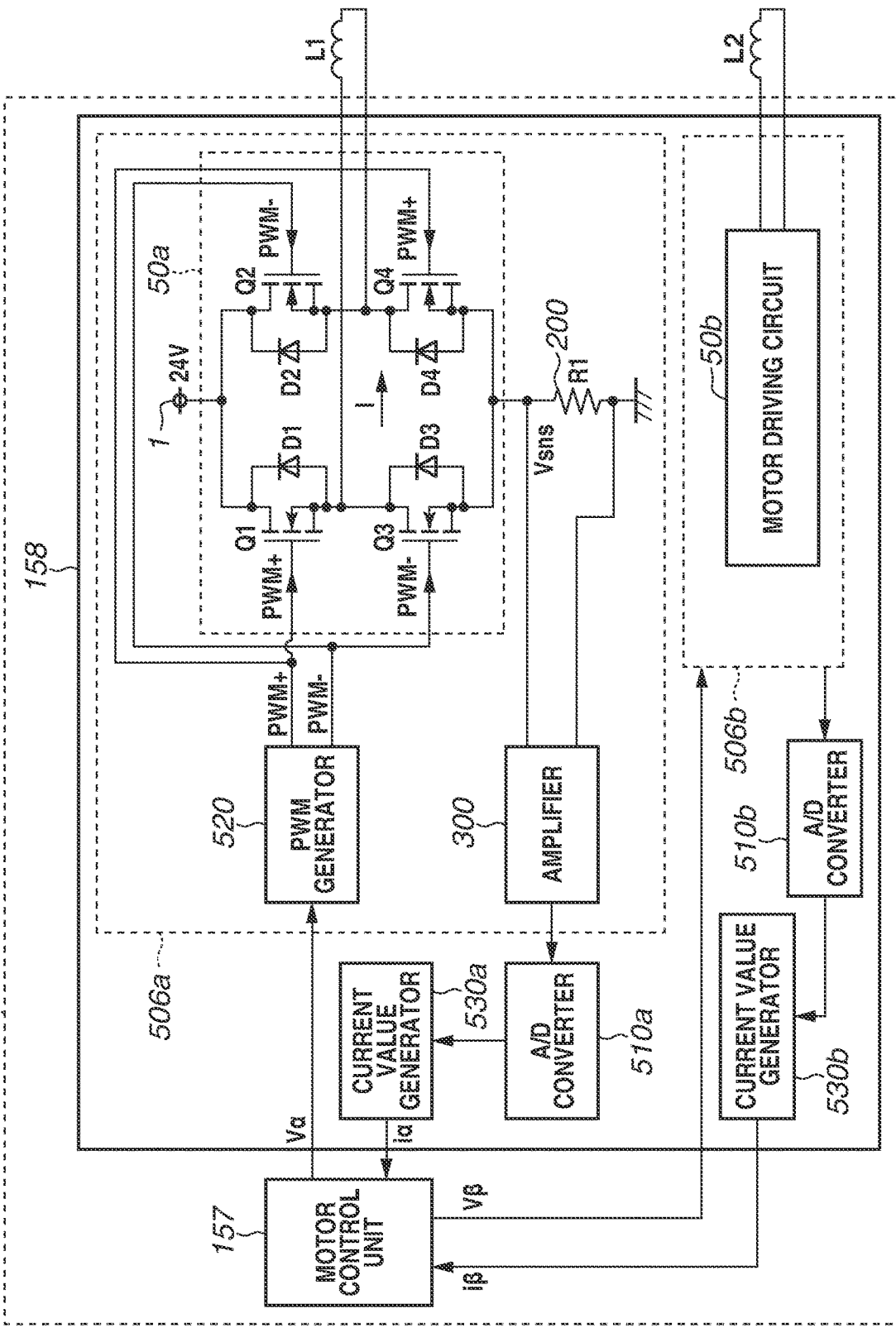
FIG. 5 is a diagram illustrating an example of a configuration of a motor driving unit.

FIG. 5 is a diagram illustrating an example of the configuration of the motor driving unit 158 according to the present exemplary embodiment. As illustrated in FIG. 5, the motor driving unit 158 includes a PWM inverter 506a, an A/D converter 510a, and a current value generator 530a in the A-phase. The motor driving unit 158 also includes a PWM inverter 506b, an A/D converter 510b, and a current value generator 530b in the B-phase. The PWM inverter 506 illustrated in FIG. 4 includes the PWM inverters 506a and 506b. The A/D converter 510 illustrated in FIG. 4 includes the A/D converters 510a and 510b. Further, the current value generator 530 illustrated in FIG. 4 includes the current value generators 530a and 530b. As described above, the PWM inverter, the A/D converter, and the current value generator are provided corresponding to each of the A-phase and the B-phase of the motor 509 and are independently driven with respect to each phase. Since the configuration of the PWM inverter 506a and the configuration of the PWM inverter 506b are similar to each other, FIG. 5 illustrates the specific configuration of the PWM inverter 506a. The PWM inverter 506a includes a motor driving circuit 50a, a PWM generator 520 that generates a PWM signal that controls an on operation and off operation of each of a plurality of field-effect transistors (FETs) Q1 to Q4 provided in the motor driving circuit 50a, and an amplifier 300 that amplifies a signal of a voltage between both ends of a resistor 200.

As illustrated in FIG. 5, the motor driving circuit 50a includes the FETs Q1 to Q4 as switching elements and a winding L1 of the motor 509. More specifically, the FETs Q1 to Q4 form an H-bridge circuit, and the winding L1 connects a connection point between the FETs Q1 and Q3 to a connection point between the FETs Q2 and Q4. Drain terminals of the FETs Q1 and Q2 are connected to a 24-V power supply terminal, and source terminals of the FETs Q3 and Q4 are connected to one end of the resistor 200. The other end of the resistor 200 is connected to the ground (GND). In other words, the resistor 200 is grounded. In FIG. 5, the winding L1 is actually a winding provided in the motor 509. More specifically, the winding L1 is provided outside the motor control device 600.

The FETs Q1 and Q4 are driven by PWM+ as the PWM signal, and the FETs Q2 and Q3 are driven by PWM− as the PWM signal. PWM+ and PWM− have an antiphase relationship with each other. More specifically, if PWM+ is 'H (high level)', PWM− is 'L (low level)'. If PWM− is 'H', PWM+ is 'L'.

If PWM+ is 'H', a driving current flows through the power supply, the FET Q1, the winding L1, the FET Q4, and the GND in this order. Then, if PWM+ changes to 'L', an induced electromotive force is generated in the winding L1 in the direction of preventing a change in the current. As a result, the driving current flows through the GND, the FET Q3, the winding L1, the FET Q2, and the power supply in this order. If PWM+ is 'L', a driving current flows through the power supply, the FET Q2, the winding L1, the FET Q3, and the GND in this order. Then, if PWM+ changes to 'H', an induced electromotive force is generated in the winding L1 in the direction of preventing a change in the current. As a result, the driving current flows through the GND, the FET Q4, the winding L1, the FET Q1, and the power supply in this order.

<Method for Supplying Driving Current>

First, a description is given of a method in which the motor driving unit 158 supplies a driving current to each winding.

Figure 6:
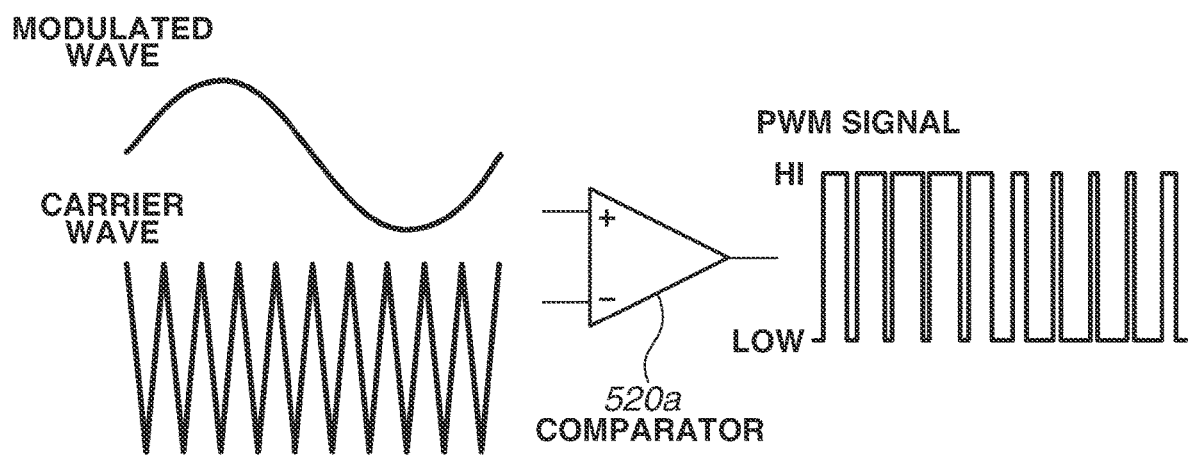
FIG. 6 is a diagram illustrating a configuration in which a pulse-width modulation (PWM) generator generates a PWM signal.

FIG. 6 is a diagram illustrating a configuration in which the PWM generator 520 according to the present exemplary embodiment generates the PWM signal. As illustrated in FIG. 6, the PWM generator 520 according to the present exemplary embodiment includes a comparator 520a that compares a modulated wave with a carrier wave. The PWM generator 520 compares the modulated wave with the carrier wave using the comparator 520a, thereby generating the PWM signal. In the present exemplary embodiment, the PWM generator 520 generates a triangular carrier wave with a predetermined frequency. In a case where a period from a timing when a value of the triangular carrier wave is a local minimum value to a timing when a value of the triangular carrier wave is a local minimum value next is one period, the waveform of the triangular carrier wave is a waveform line-symmetric with respect to the timing when the value of the triangular carrier wave is a maximum value in one period. The triangular carrier wave in the A-phase and the triangular carrier wave in the B-phase are synchronized with each other.

Figure 7:
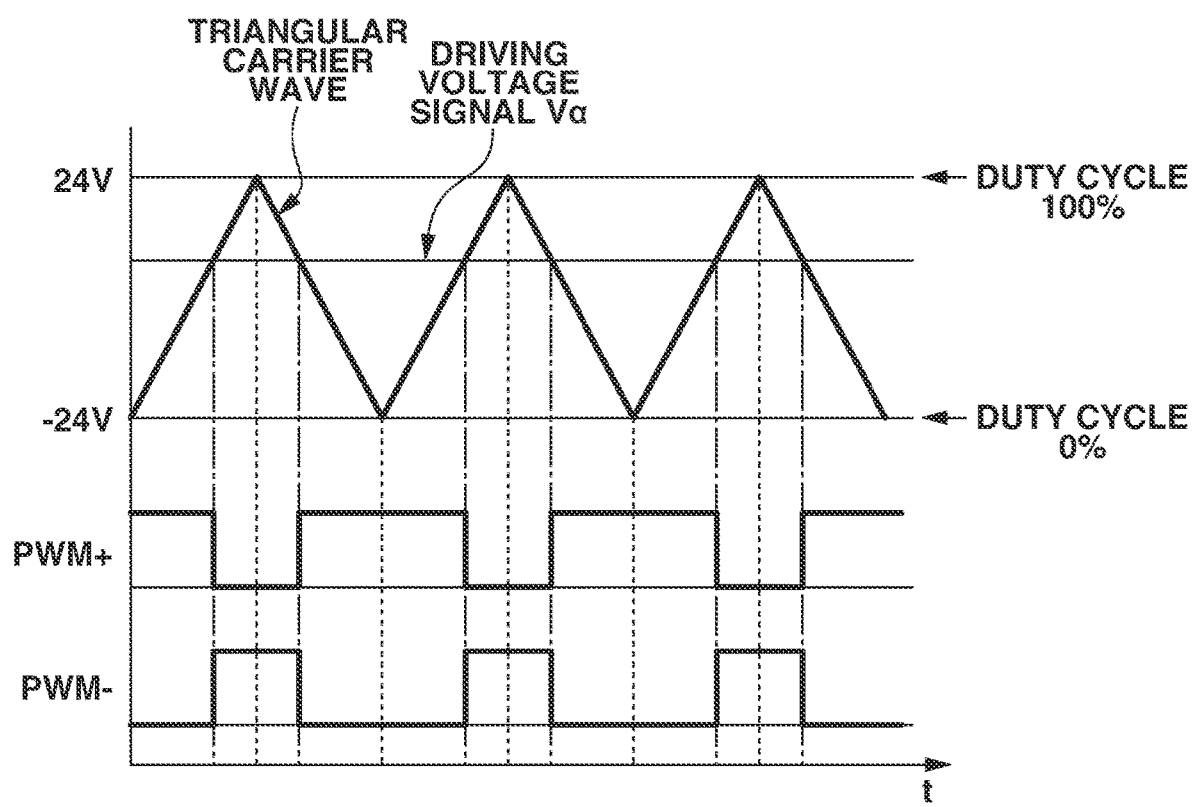
FIG. 7 is a diagram illustrating a method in which the PWM generator generates the PWM signal.

FIG. 7 is a diagram illustrating a method in which the PWM generator 520 generates the PWM signal. With reference to FIGS. 5 to 7, a description is given of the method in which the PWM generator 520 generates the PWM signal.

As illustrated in FIG. 5, a driving voltage $V\alpha$ output from the motor control unit 157 is input to the PWM generator 520. The PWM generator 520 compares the driving voltage $V\alpha$ as a modulated wave with a triangular carrier wave using the comparator 520a. In a period when the driving voltage $V\alpha$ is greater than the triangular carrier wave (high period), the PWM generator 520 generates PWM+ as 'H'. In a period when the driving voltage $V\alpha$ is smaller than the triangular carrier wave (low period), the PWM generator 520 generates PWM+ as 'L'. The PWM generator 520 generates PWM− by reversing the phase of PWM+.

As illustrated in FIG. 5, the PWM generator 520 outputs PWM+ to the FETs Q1 and Q4 and outputs PWM− to the FETs Q2 and Q3. The on operation and the off operation of each of the FETs Q1 to Q4 are controlled by PWM+ and PWM−. As a result, it is possible to control magnitude and a direction of the driving current to be supplied to the winding L1 in the A-phase.

In the present exemplary embodiment, if the driving voltage is 24 V, the duty cycle corresponds to 100%. If the driving voltage is 0 V, the duty cycle corresponds to 50%. If the driving voltage is −24 V, the duty cycle corresponds to 0%. In other words, in the present exemplary embodiment, the driving voltage $V\alpha$ is a value corresponding to the duty cycle of PWM+. In the present exemplary embodiment, a ratio of the high period to the period of PWM+ is defined as the duty cycle. Alternatively, a ratio of the low period to the period of PWM+ may be defined as the duty cycle.

<Current Detection Method>

Next, a description is given of a method in which the motor driving unit 158 detects the current value of the driving current flowing through each winding.

As described above, the driving current flowing through the winding L1 is detected based on a voltage Vsns applied to the resistor 200. The amplifier 300 amplifies a signal of the voltage Vsns and outputs the amplified signal to the A/D converter 510a. The A/D converter 510a converts the voltage Vsns from an analog value to a digital value and outputs the digital value to the current value generator 530a.

The current value generator 530a samples the value output from the A/D converter 510a in a predetermined period and generates a current value based on the sampled value. The current value generator 530a outputs the generated current value as a current value $i\alpha$.

<Method for Determining Type of Motor>

Next, a description is given of a method for determining a type of motor attached to the motor control device 600. In the present exemplary embodiment, the configuration described below is applied, thereby preventing control of a motor from being unstable.

Figure 8:
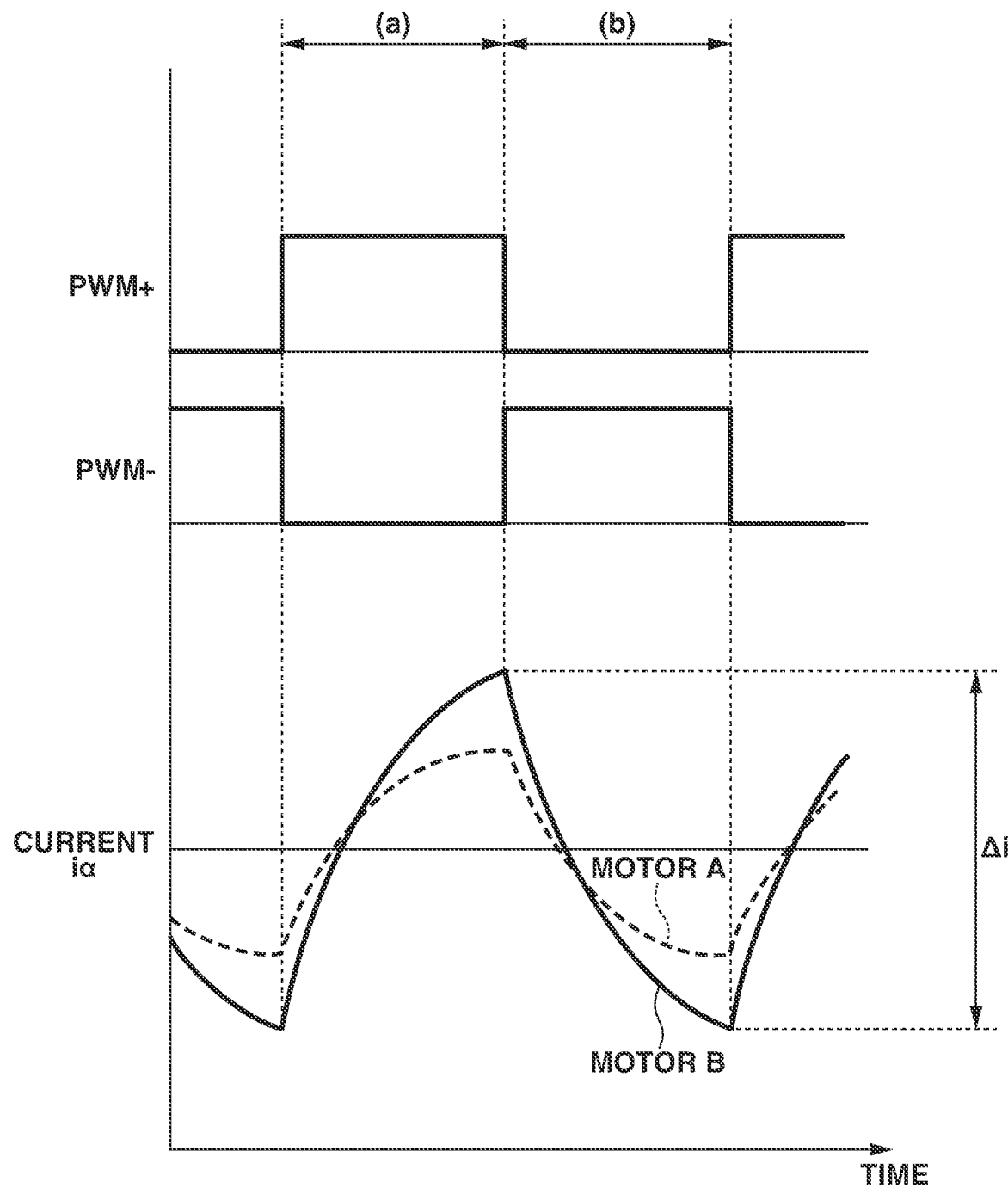
FIG. 8 is a diagram illustrating a current $i\alpha$ in a case where a duty cycle of PWM+ is 50%.

FIG. 8 is a diagram illustrating a current iα in a case where the duty cycle of PWM+ is 50%. As illustrated in FIG. 8, in the case where the duty cycle of PWM+ is 50%, a maximum value and a minimum value of the current iα flowing through each winding of the motor A are values different from a maximum value and a minimum value of the current iα flowing through each winding of the motor B. This is because the resistance value R and the inductance value L of the winding of the motor A are values different from the resistance value R and the inductance value L of the winding of the motor B. Even if the duty cycle of PWM+ is a value other than 50%, the maximum value and the minimum value of the current iα flowing through the winding of the motor A are values different from the maximum value and the minimum value of the current iα flowing through the winding of the motor B.

In the present exemplary embodiment, in the state where a voltage is applied to each winding in the A-phase based on the PWM signal of which the duty cycle is set to a predetermined value (e.g., 50%), based on a current flowing through the winding in the A-phase, the type of motor attached to the motor control device 600 is determined.

As illustrated in FIG. 4, the current values iα and iβ generated by the current value generator 530 are output to the CPU 151a. Based on a local maximum value (maximum value) of the current value iα in a period from a timing when the current value iα is a local minimum value first after the current value iα is input to a timing when the current value iα is the local minimum value next, the CPU 151a determines the type of motor attached to the motor control device 600. More specifically, if the local maximum value of the current value iα in the above period is greater than or equal to a threshold ith, the CPU 151a determines that the motor 509 attached to the motor control device 600 is the motor B. Thus, the CPU 151a sets the control values to be the values corresponding to the motor B. If the local maximum value of the current value iα in the above period is less than the threshold ith, the CPU 151a determines that the motor 509 attached to the motor control device 600 is the motor A. Thus, the CPU 151a sets the control values to be the values corresponding to the motor A. The threshold ith is set to a value greater than the local maximum value of a current flowing through each winding of the motor A in a state where a voltage is applied to the winding based on the PWM signal of which the duty cycle is set to the predetermined value. Further, the threshold ith is set to a value smaller than the local maximum value of a current flowing through each winding of the motor B in the state where a voltage is applied to the winding based on the PWM signal of which the duty cycle is set to the predetermined value. In other words, the local maximum value of the current value iα being less than the threshold ith means that the motor 509 attached to the motor control device 600 is the motor A. The local maximum value of the current value iα being greater than the threshold ith means that the motor 509 attached to the motor control device 600 is the motor B.

Figure 9:
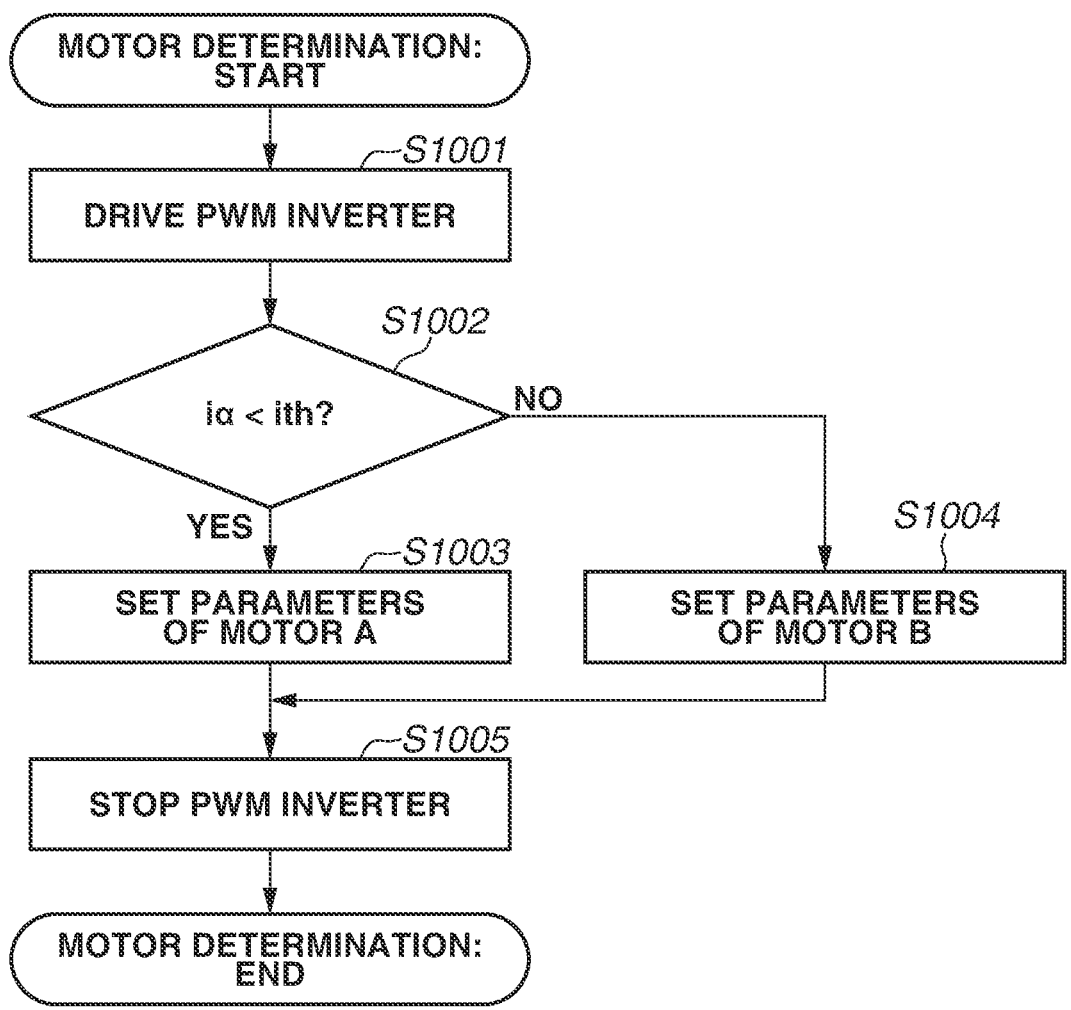
FIG. 9 is a flowchart illustrating a method for determining a type of motor.

FIG. 9 is a flowchart illustrating the method for determining the type of motor. The processing of the flowchart is executed by the CPU 151a. However, the processing of the flowchart may also be executed in a manner that allows the user to set execution of a process of determining the type of motor. The processing of the flowchart may also be executed each time the image forming apparatus 100 returns from a sleep state (power saving mode), or when the power supply of the image forming apparatus 100 changes from an off state to an on state.

In step S1001, the CPU 151a drives the PWM inverter 506 (motor driving unit 158). More specifically, the CPU 151a sets the duty cycle of PWM+ to the predetermined value and applies a voltage to each winding of the motor 509.

If the current value iα is less than the threshold ith in step S1002 (YES in step S1002), then in step S1003, the CPU 151a determines that the motor 509 attached to the motor control device 600 is the motor A. Thus, the CPU 151a sets the control values in the motor control device 600 to be the control values corresponding to the motor A.

If the current value iα is greater than or equal to the threshold ith in step S1002 (NO in step S1002), then in step S1004, the CPU 151a determines that the motor 509 attached to the motor control device 600 is the motor B. Thus, the CPU 151a sets the control values in the motor control device 600 to be the control values corresponding to the motor B.

In step S1005, the CPU 151a stops driving the PWM inverter 506 (motor driving unit 158), and the processing of the flowchart ends.

<Temperature Dependency of Resistance Value R and Inductance Value L>

Figure 10:
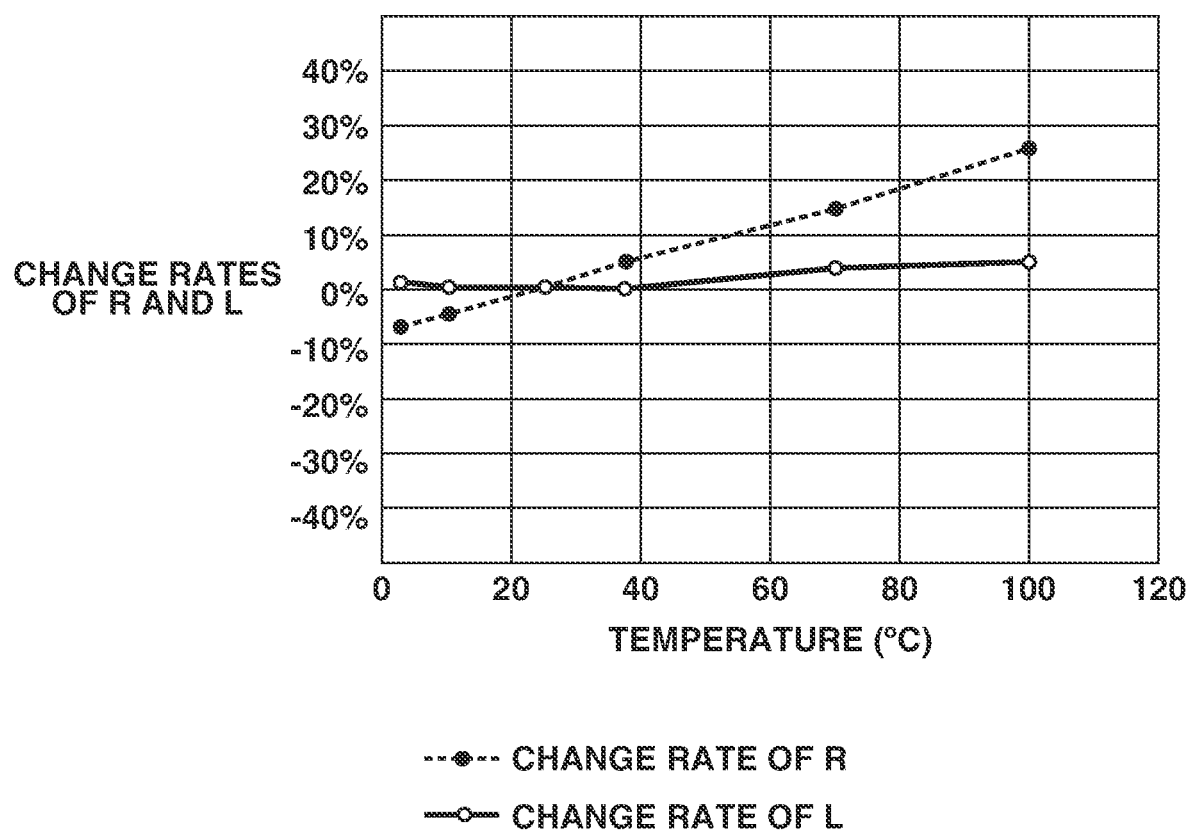
FIG. 10 is a diagram illustrating temperature dependency of a resistance value R and an inductance value L.

FIG. 10 is a diagram illustrating the temperature dependency of the resistance value R and the inductance value L of each winding. FIG. 10 illustrates the temperature dependency of the resistance value R and the inductance value L of the winding based on measured values of the resistance value R and the inductance value L under an environment with a temperature of 25° C.

As illustrated in FIG. 10, the resistance value R changes about 25% between 0° C. and 100° C. On the other hand, the inductance value L changes about 5% between 0° C. and 100° C. Thus, in determining the type of motor based on the current value of a current flowing through the winding, it is desirable to use the current value detected in a state where an influence of the resistance value R, which significantly changes depending on the temperature, is relatively small.

Figure 11:
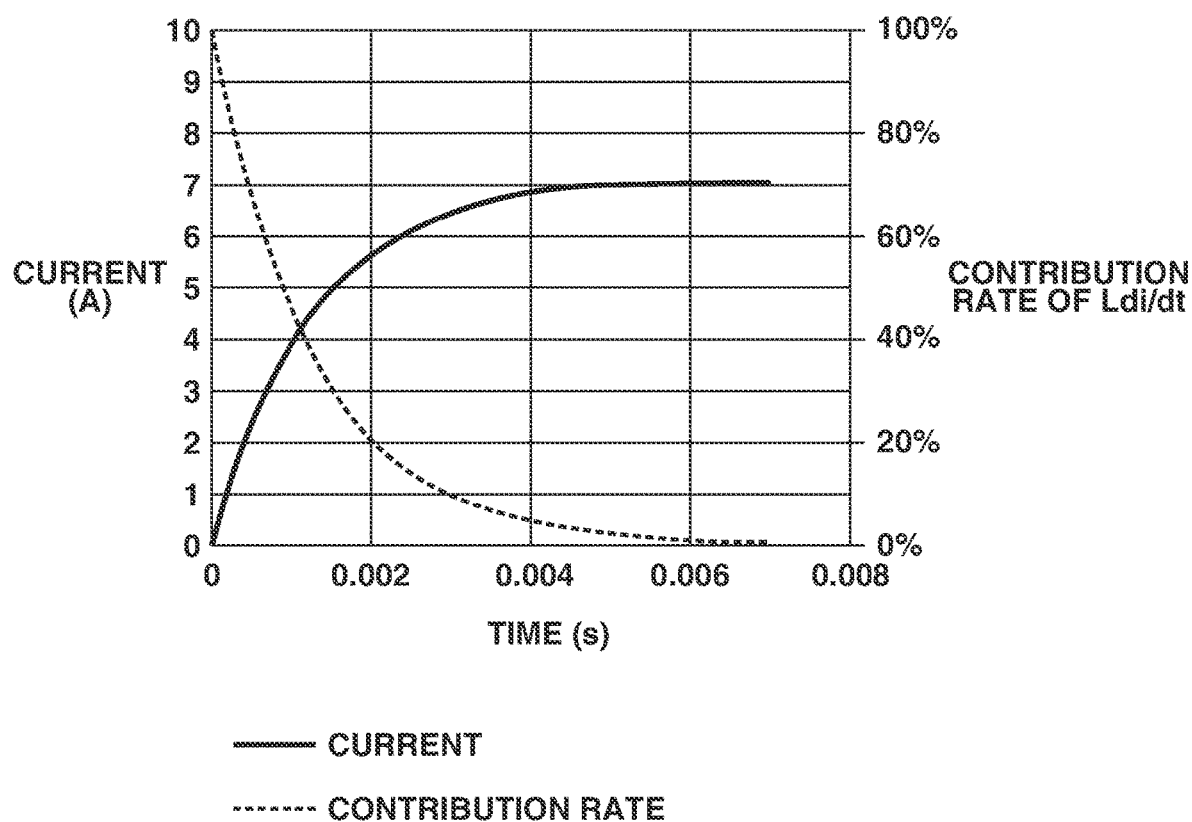
FIG. 11 is a diagram illustrating a result of simulating a current waveform.

FIG. 11 is a diagram illustrating a result of simulating a current waveform using the following formula (10).

$$i = V/R*(1-\text{EXP}(-R/L*t)) \tag{10}$$

In the formula (10), t is the time for which a voltage V is applied to the winding.

The motor 509 does not rotate in the process of determining the type of motor. Thus, an inductive voltage E generated in the winding is equivalent to 0 V. Thus, the voltage V to be applied to the winding is represented by the following formula (11).

$$V = R*i + L*di/dt \tag{11}$$

FIG. 11 illustrates a ratio of contribution (contribution rate) of a term of L*di/dt in the formula (11) to the voltage V at different times. As illustrated in FIG. 11, immediately after the voltage V is applied to the winding, an absolute value of a current i is relatively small, and the current i rapidly increases. Thus, the term of L*di/dt is much greater than the term of R*i. In other words, immediately after the voltage V is applied to the winding, the ratio of contribution of the term of L*di/dt to the voltage V is very large. In the present exemplary embodiment, in a period from when the voltage V is applied to the winding to when the voltage V has been applied for 70 µs, the ratio of contribution of the term of L*di/dt to the voltage V is 95% or more. Then, as the time for which the voltage V is applied becomes longer, the current i comes close to a steady state. Then, the ratio of contribution of the term of L*di/dt to the voltage V converges to 0%.

As described above, in the present exemplary embodiment, in the state where a voltage is applied to winding in the A-phase based on the PWM signal of which the duty cycle is set to 50%, the type of motor attached to the motor control device 600 is determined based on the current flowing through the winding in the A-phase. A PWM period according to the present exemplary embodiment is set to 25 µs. If the PWM period is set to 25 µs and the duty cycle is set to 50%, the time for which the voltage is applied to the winding is 12.5 µs. As illustrated in FIG. 11, if the time for which the voltage is applied to the winding is 12.5 µs, the ratio of contribution of the term of L*di/dt to the voltage V is 98% or more. In other words, the influence of the resistance value R included in the current used in the process of determining the motor according to the present exemplary embodiment is much smaller than the influence of the inductance value L.

Figure 12:
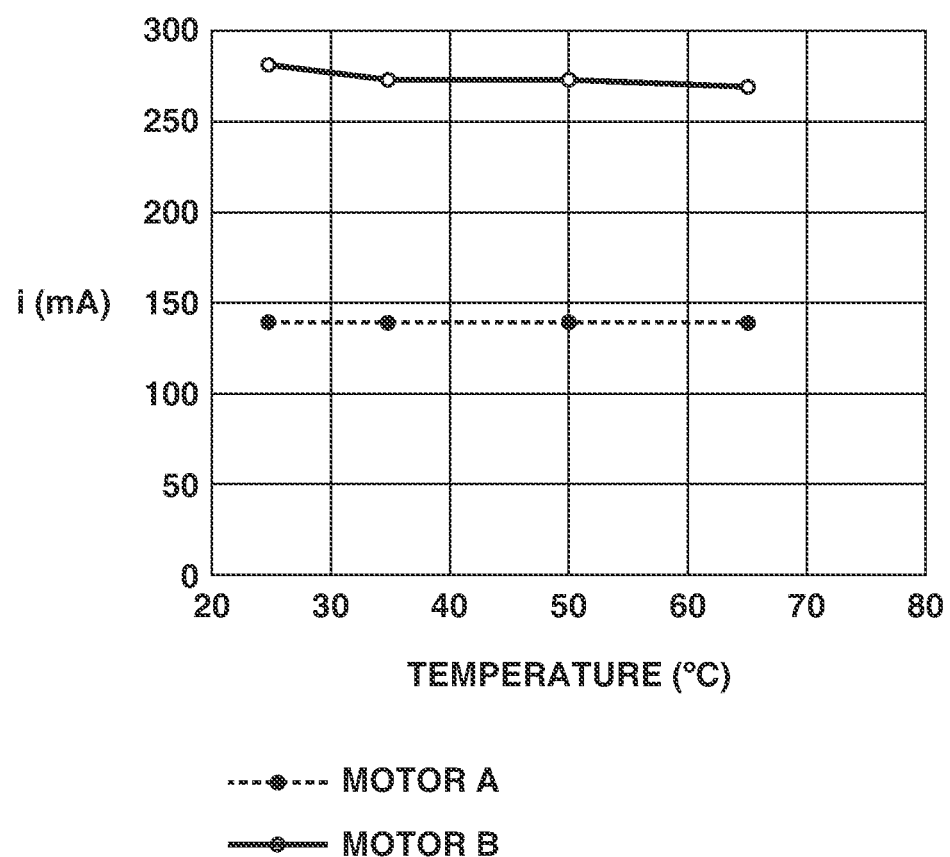
FIG. 12 is a diagram illustrating temperature dependency of a local maximum value of the current value iα of a motor A and a local maximum value of the current value iα of a motor B.

FIG. 12 is a diagram illustrating the temperature dependency of the local maximum value of the current value iα of the motor A (dashed line) and the local maximum value of the current value iα of the motor B (solid line). As illustrated in FIG. 12, a change, caused by temperature around the motor, in the current waveform used in the process of determining the motor according to the present exemplary embodiment is very small.

As described above, in the present exemplary embodiment, in the state where a voltage is applied to each winding in the A-phase based on the PWM signal of which the duty cycle is set to the predetermined value (e.g., 50%), the type of motor attached to the motor control device 600 is determined based on a current flowing through the winding in the A-phase. More specifically, if the local maximum value of the current value iα is greater than or equal to the threshold ith, the CPU 151a determines that the motor 509 attached to the motor control device 600 is the motor B. Thus, the CPU 151a sets the control values to be the values corresponding to the motor B. If the local maximum value of the current value iα is less than the threshold ith, the CPU 151a determines that the motor 509 attached to the motor control device 600 is the motor A. Thus, the CPU 151a sets the control values to be the values corresponding to the motor A. As a result, it is possible to control the motor 509 attached to the motor control device 600 using the control values corresponding to the motor 509. In other words, it is possible to prevent control of the motor from being unstable.

In the present exemplary embodiment, the PWM period is set to 25 µs, and the duty cycle is set to 50%. As a result, it is possible to determine the type of motor in the state where a change, caused by temperature, in the current waveform is very small. More specifically, it is possible to determine the type of motor with high accuracy. Thus, it is possible to control the motor 509 attached to the motor control device 600 using the control values corresponding to the motor 509. In other words, it is possible to prevent control of the motor from being unstable.

In the present exemplary embodiment, the CPU 151a determines the type of motor attached to the motor control device 600 based on the maximum value of the current value iα in the period from the timing when the current value iα is the local minimum value first after the current value iα is input to the timing when the current value iα is the local minimum value next. However, the present invention is not limited to this. For example, the CPU 151a may determine the type of motor attached to the motor control device 600 based on the local minimum value (minimum value) of the current value iα in the period from the timing when the current value iα is the local minimum value first after the current value iα is input to the timing when the current value iα is the local minimum value next.

Alternatively, for example, the CPU 151a may determine the type of motor attached to the motor control device 600 based on the local maximum value of the current value iα in the period from the timing when the current value iα is the local minimum value first after a lapse of a predetermined time since an input of the current value iα to the timing when the current value iα is the local minimum value next (predetermined period). The predetermined time is, for example, a time longer than the time from the timing when PWM+ changes from 'L' to 'H' to the timing when PWM+ changes again from 'L' to 'H' first after the timing when PWM+ changes from 'L' to 'H' (PWM period).

Alternatively, the CPU 151a may determine the type of motor attached to the motor control device 600, for example, based on an average value of the local maximum values of the current value iα in a predetermined period. The predetermined period is, for example, a time longer than twice the PWM period.

Next, an image forming apparatus 100 according to a second exemplary embodiment is described. In the descriptions below, components of the image forming apparatus 100 similar to those of the image forming apparatus 100 according to the first exemplary embodiment are not described.

As described in the first exemplary embodiment, each of the current values iα and iβ of a current flowing through the winding of the motor 509 is generated based on a signal amplified by the amplifier 300. The signal output from the amplifier 300 may include a predetermined voltage (offset voltage). As a result, each of the generated current values iα and iβ includes a current value corresponding to the offset voltage. If the current value used to determine the type of motor includes the current value corresponding to the offset voltage, the type of motor may be erroneously determined.

Accordingly, in the present exemplary embodiment, the following configuration is applied so that the type of motor is determined with higher accuracy.

In the present exemplary embodiment, as illustrated in FIG. 8, the type of motor attached to the motor control device 600 is determined based on a difference value Δi between the local maximum value and the local minimum value of the current value iα. More specifically, for example, if the difference value Δi between the local maximum value and the local minimum value in one period of the PWM period is greater than or equal to a threshold Δith, the CPU 151a determines that the motor 509 attached to the motor control device 600 is the motor B. Thus, the CPU 151a sets the control values to be the values corresponding to the motor B. If the difference value Δi is less than the threshold Δith, the CPU 151a determines that the motor 509 attached to the motor control device 600 is the motor A. Thus, the CPU 151a sets the control values to be the values corresponding to the motor A. The threshold Δith is set to a value greater than the difference value Δi of the motor A in a state where a voltage is applied to each winding based on the PWM signal of which the duty cycle is set to the predetermined value. Further, the threshold Δith is set to a value smaller than the difference value Δi of the motor B in the state where a voltage is applied to each winding based on the PWM signal of which the duty cycle is set to the predetermined value. In other words, the difference value Δi being less than the threshold Δith means that the motor 509 attached to the motor control device 600 is the motor A. The difference value Δi being greater than the threshold Δith means that the motor 509 attached to the motor control device 600 is the motor B.

As described above, in the present exemplary embodiment, the type of motor attached to the motor control device 600 is determined based on the difference value Δi between the local maximum value and the local minimum value of the current value iα. The local maximum value and the local minimum value of the current value iα include the above-described current value corresponding to the offset voltage. By using the difference value Δi between the local maximum value and the local minimum value, the type of motor can be determined based on a value not including the current value corresponding to the offset voltage. As a result, it is possible to determine the type of motor with higher accuracy.

The CPU 151a may determine the type of motor attached to the motor control device 600 based on a difference value between an average value of the local maximum values of the current value iα in a predetermined period and an average value of the local minimum values of the current value iα in the predetermined period. The predetermined period is, for example, a time longer than twice the PWM period.

In the first and second exemplary embodiments, a stepping motor is used as a motor for driving a load. Alternatively, another motor such as a direct current (DC) motor may be used. The motor is not limited to a two-phase motor, and the present exemplary embodiment can also be applied to another motor such as a three-phase motor.

In the first and second exemplary embodiments, a permanent magnet is used as the rotor. However, the present invention is not limited to this.

In the first and second exemplary embodiments, the CPU 151a determines the type of motor attached to the motor control device 600 based on the current value iα. However, the present invention is not limited to this. For example, the CPU 151a may determine the type of motor attached to the motor control device 600 based on the current value iβ.

Figure 13:
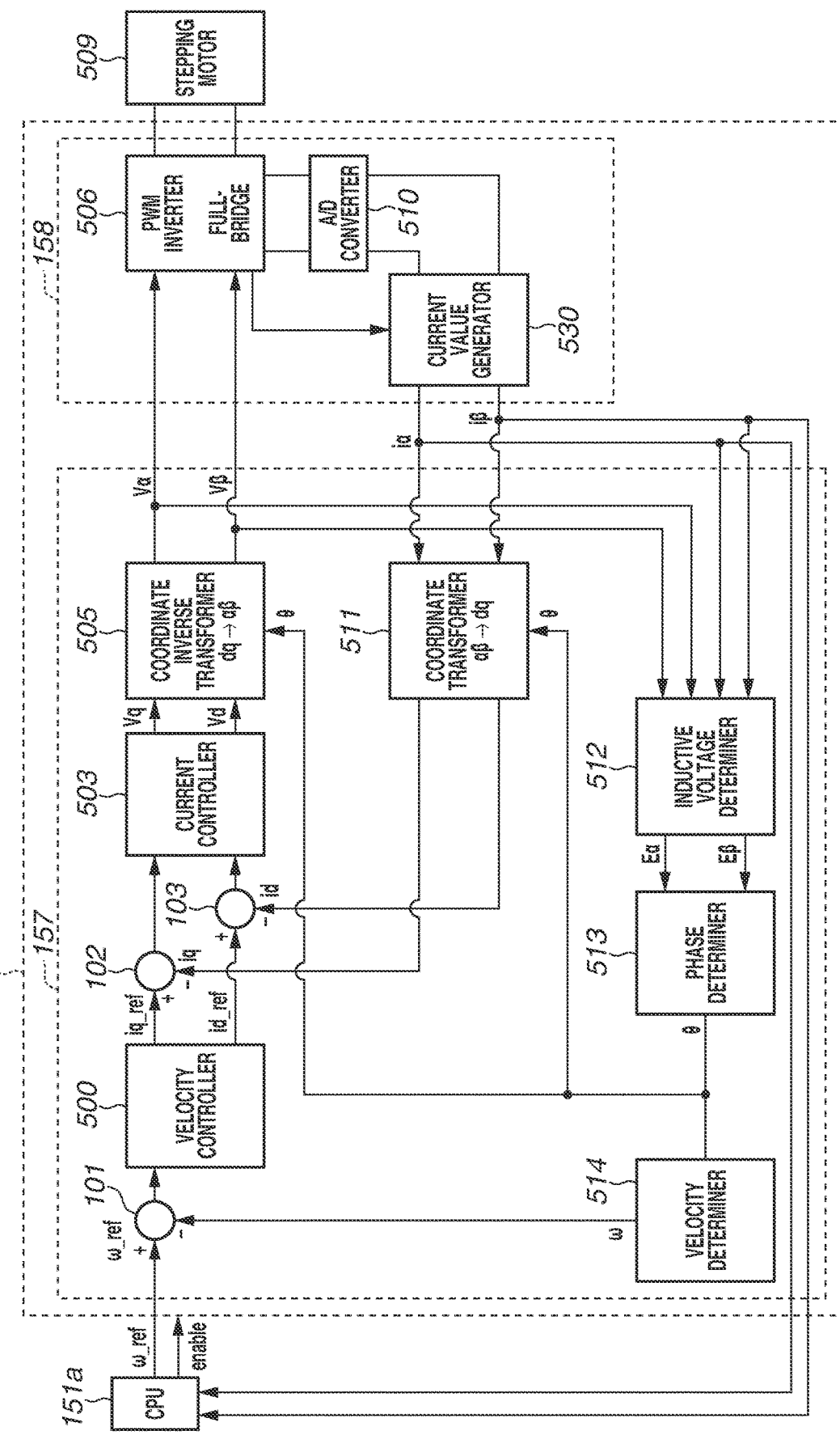
FIG. 13 is a block diagram illustrating a configuration of a motor control device that performs velocity feedback control.

In the vector control according to the first and second exemplary embodiments, the motor is controlled by performing the phase feedback control. However, the present invention is not limited to this. For example, a configuration may be employed in which the motor is controlled by feeding back a rotational velocity w of the rotor 402. More specifically, as illustrated in FIG. 13, a velocity determiner 514 is provided inside the motor control unit 157, and the velocity determiner 514 determines the rotational velocity w based on a change over time in the rotational phase θ output from the phase determiner 513. The velocity is determined using the following formula (12).

$$\omega = d\theta/dt \quad (12)$$

Then, the CPU 151a outputs an instruction velocity ω_ref that represents a target velocity of the rotor 402. Further, a configuration is employed in which a velocity controller 500 is provided inside the motor control unit 157. The velocity controller 500 generates the q-axis current instruction value iq_ref and the d-axis current instruction value id_ref so as to make the deviation between the rotational velocity w and the instruction velocity ω_ref small. Then, the velocity controller 500 outputs the q-axis current instruction value iq_ref and the d-axis current instruction value id_ref. Thus, the motor can also be controlled by performing such velocity feedback control.

According to the present invention, it is possible to prevent the control of the motor from being unstable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-016445, filed Jan. 31, 2019, which is hereby incorporated by reference herein in its entirety.

What is claimed is:

1. A motor control device comprising:
a driving circuit that includes a switching element and to which a winding of a motor attached to the motor control device is connected;
a generator configured to generate a pulse-width modulation (PWM) signal that controls an on operation and an off operation of the switching element, the PWM signal including a signal at a first level as one of a high level and a low level and a signal at a second level as the other of the high level and the low level;
a detector configured to detect a driving current flowing through the winding;
a phase determiner configured to determine a rotational phase of a rotor of the motor; and
a controller including a first mode in which a predetermined voltage based on the PWM signal of which a duty ratio is set to a predetermined value is applied to the winding and a second mode in which the driving current is controlled by a vector control based on a torque current component and an excitation current component, the duty ratio being a value indicating a ratio of a period in which the PWM signal is at the first level to one period of the PWM signal, the torque current component being a current component that is represented in a rotating coordinate system based on the rotational phase determined by the phase determiner and that generates torque in the rotor, the excitation current component being a current component that is represented in the rotating coordinate system and that affects strength of magnetic flux through the winding,
wherein the controller is configured to determine an inductance value as a control value corresponding to the motor attached to the motor control device based on both a local maximum value and a local minimum value of the driving current detected by the detector in the first mode,
wherein, in the second mode, the phase determiner determines the rotational phase based on both the driving current detected by the detector in the second mode and the control value determined by the controller.

2. The motor control device according to claim 1, wherein, in a case where a difference value between the local maximum value and the local minimum value is greater than a predetermined value, the controller sets a control value corresponding to a first motor as the control value, and in a case where the difference value is less than the predetermined value, the controller sets a control value corresponding to a second motor as the control value, a type of the second motor being different from a type of the first motor.

3. The motor control device according to claim 1, wherein, in a case where a difference value between an average value of a plurality of local maximum values in a predetermined period and an average value of a plurality of local minimum values in the predetermined period is greater than a predetermined value, the controller sets a control value corresponding to a first motor as the control value, and in a case where the difference value is less than the predetermined value, the controller sets a control value corresponding to a second motor as the control value, a type of the second motor being different from a type of the first motor.

4. The motor control device according to claim 1, wherein the predetermined value is a value indicating that the duty ratio is 50%.

5. The motor control device according to claim 1, wherein, in the second mode, the phase determiner determines an inductive voltage to be induced in the winding based on both the driving current detected by the detector in the second mode and the inductance value as the control value, wherein the phase determiner determines the rotational phase based on the determined inductive voltage.

6. The motor control apparatus according to claim 1, wherein the driving current is controlled by the vector control so that a deviation between an instructed phase indicating a target phase of the rotor and the rotational phase determined by the phase determiner is reduced in the second mode.

7. The motor control apparatus according to claim 1, further comprising a speed determiner configured to determine a rotational speed of the rotor, wherein the driving current is controlled by the vector control so that a deviation between an instructed speed indicating a target speed of the rotor and the rotational speed determined by the speed determiner is reduced in the second mode.

* * * * *